(12) United States Patent
Gibelin et al.

(10) Patent No.: US 10,487,967 B2
(45) Date of Patent: Nov. 26, 2019

(54) FLUID CONNECTOR WITH LOCKING RING

(71) Applicant: SARTORIUS STEDIM FMT SAS, Aubagne (FR)

(72) Inventors: Jeremy Gibelin, Le Beausset (FR); Florian Blake, La Ciotat (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 459 days.

(21) Appl. No.: 15/118,769

(22) PCT Filed: Feb. 11, 2015

(86) PCT No.: PCT/FR2015/050333
§ 371 (c)(1),
(2) Date: Aug. 12, 2016

(87) PCT Pub. No.: WO2015/121585
PCT Pub. Date: Aug. 20, 2015

(65) Prior Publication Data
US 2017/0045169 A1 Feb. 16, 2017

(30) Foreign Application Priority Data
Feb. 14, 2014 (FR) ..................... 14 51186

(51) Int. Cl.
*F16L 37/00* (2006.01)
*F16L 37/08* (2006.01)
(Continued)

(52) U.S. Cl.
CPC ........... *F16L 37/0841* (2013.01); *F16L 37/00* (2013.01); *F16L 37/08* (2013.01); *F16L 37/084* (2013.01);
(Continued)

(58) Field of Classification Search
CPC ... F16L 3/00; F16L 3/1025; F16L 3/13; F16L 37/00; F16L 37/0841; F16L 37/088;
(Continued)

(56) References Cited

U.S. PATENT DOCUMENTS 5,104,158 A 4/1992 Meyer et al.
5,683,117 A * 11/1997 Corbett ................. F16L 37/088
285/24

(Continued)

FOREIGN PATENT DOCUMENTS

WO 2010/011883 A1 1/2010

OTHER PUBLICATIONS

International Search Report, dated May 15, 2015, from corresponding PCT application.

*Primary Examiner* — Anna M Momper
*Assistant Examiner* — William S. Choi
(74) *Attorney, Agent, or Firm* — Young & Thompson

(57) ABSTRACT

Female connector for accepting a male connector having a retaining external annular rim, a slot including two parallel lateral grooves and the slot opening at least at one of its ends forming a mouth of the housing, the female connector including a locking slide distinct from the body, movable between a locking position and an unlocking position, the locking slide including a locking plate and an actuating knob formed integrally with the plate, with a retaining portion belonging to the locking plate to come into abutment against the retaining outer annular rim, the locking slide including at least one flexible tab formed integrally, returning the slide toward the first position, the flexible tab pressing on each side of the mouth in the axial direction X so that the return force is balanced about X and creates no torque that could have a tendency to cause the locking plate to jam.

14 Claims, 6 Drawing Sheets

(51) Int. Cl.
*F16L 37/084* (2006.01)
*F16L 37/088* (2006.01)

(52) U.S. Cl.
CPC ......... *F16L 37/088* (2013.01); *F16L 2201/44* (2013.01)

(58) Field of Classification Search
CPC ......... F16L 37/10; F16L 37/144; F16L 37/56; F16L 37/08; F16L 37/084
USPC .... 285/1, 61, 80, 81, 86, 89, 304, 305, 310, 285/307, 308, 315, 317, 319, 420
See application file for complete search history.

(56) References Cited

U.S. PATENT DOCUMENTS

| | | | | |
|---|---|---|---|---|
| 5,718,692 | A * | 2/1998 | Schon | A61M 25/007 604/264 |
| 5,799,986 | A * | 9/1998 | Corbett | F16L 37/0841 285/305 |
| 5,863,077 | A * | 1/1999 | Szabo | F16L 37/144 285/3 |
| 6,206,435 | B1 | 3/2001 | Le Clinche | |
| 6,231,089 | B1 * | 5/2001 | DeCler | F16L 37/0841 285/308 |
| 6,719,749 | B1 * | 4/2004 | Schweikert | A61M 25/0009 604/28 |
| 8,113,547 | B2 * | 2/2012 | Andre | F16L 37/144 285/310 |
| 9,115,834 | B2 * | 8/2015 | Parks | F16L 37/144 |
| 2001/0048225 | A1 * | 12/2001 | Andre | F16L 33/00 285/305 |
| 2002/0079696 | A1 * | 6/2002 | Szabo | F16L 37/144 285/39 |
| 2003/0075922 | A1 * | 4/2003 | Andre | F16L 37/144 285/305 |
| 2006/0055172 | A1 * | 3/2006 | Szabo | F16L 37/144 285/305 |
| 2006/0082144 | A1 * | 4/2006 | Okada | F16L 37/144 285/305 |
| 2006/0082145 | A1 * | 4/2006 | Steveley | F16L 37/144 285/305 |
| 2006/0128180 | A1 * | 6/2006 | Gammons | F16L 37/0841 439/76.1 |
| 2006/0170211 | A1 * | 8/2006 | Matsubara | F16L 37/144 285/308 |
| 2007/0236012 | A1 * | 10/2007 | Kerin | F16L 37/088 285/308 |
| 2007/0273150 | A1 * | 11/2007 | Tsurumi | F16L 37/144 285/305 |
| 2008/0048442 | A1 * | 2/2008 | Kerin | F16L 25/01 285/305 |
| 2008/0224469 | A1 | 9/2008 | Ostergren et al. | |
| 2009/0167018 | A1 * | 7/2009 | Lien | F16L 37/38 285/308 |
| 2009/0261582 | A1 * | 10/2009 | Gaudin | F16L 37/0841 285/321 |
| 2010/0127492 | A1 * | 5/2010 | Poder | F16L 37/0841 285/93 |
| 2011/0089684 | A1 * | 4/2011 | Schutte | F16L 37/144 285/305 |
| 2011/0127766 | A1 * | 6/2011 | Tsurumi | F16L 37/144 285/305 |
| 2014/0312614 | A1 * | 10/2014 | Barthel | F16L 37/088 285/319 |
| 2016/0201835 | A1 * | 7/2016 | Jones | F16L 37/12 285/305 |

* cited by examiner

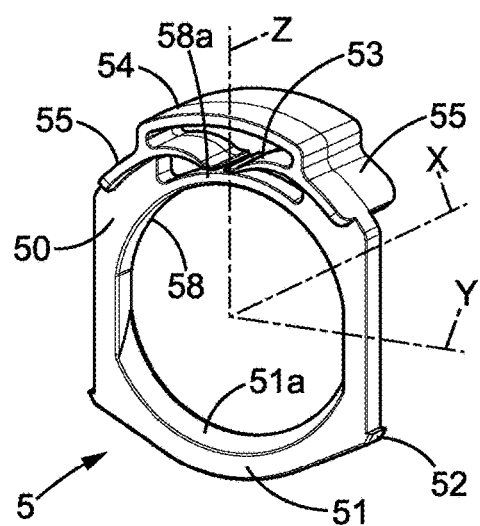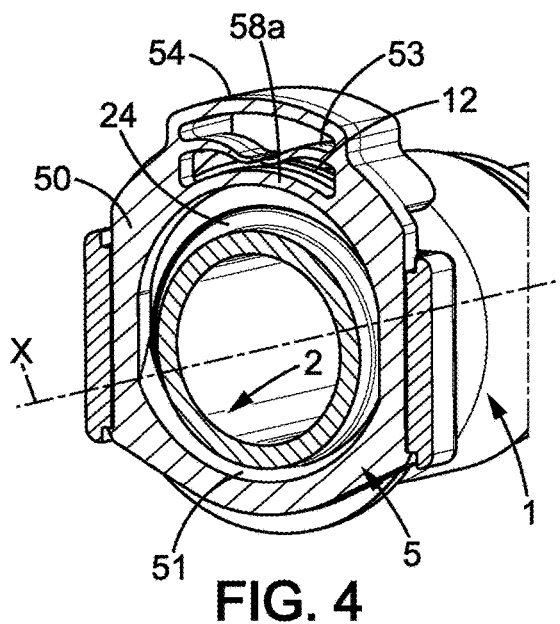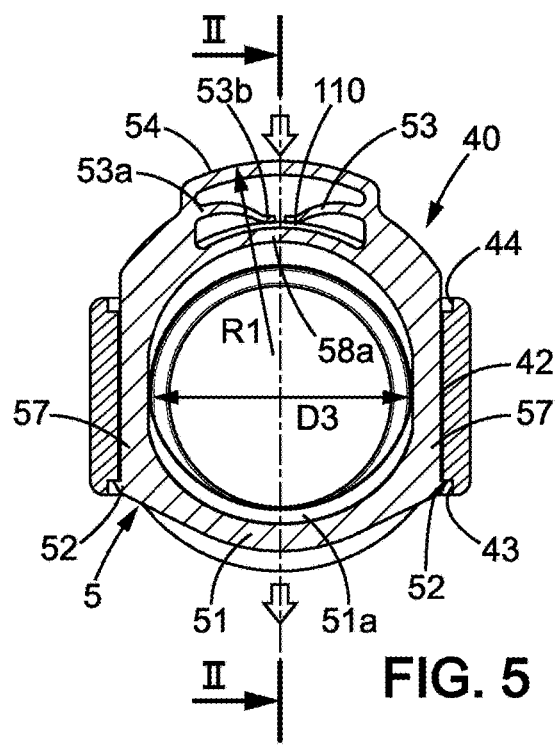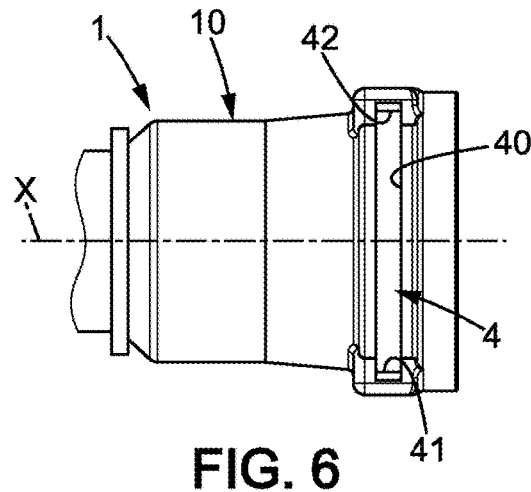
FIG. 3
FIG. 4
FIG. 5
FIG. 6

FLUID CONNECTOR WITH LOCKING RING

FIELD OF THE INVENTION

The invention relates to fluidic connectors, in particular for fluidic connections or couplings that connect a female connector to a male connector for the purpose of connecting one fluid pipe to another pipe or to a container, in the field of biopharmaceutical applications.

More specifically, flexible tubes or pipes, and recipients or containers, are used in the biopharmaceutical field to transport and contain various biopharmaceutical substances, usually with the necessary aseptic precautions.

In the field of biopharmaceutical applications, fluids are transported and stored at low pressure, usually below 10 bar and most often below 2 bar, preferably at a pressure close to atmospheric pressure.

When using certain substances, it may be necessary to temporarily guarantee sufficiently sterile conditions after various components (pipes and/or containers) have been connected, while maintaining the possibility of uncoupling the connection when necessary.

To this end, it is convenient to use male-female locking connections that can be unlocked by a specific action.

This kind of connection needs to be obtained by a simple and quick coupling. In practice, solutions are preferred where the coupling is achieved by an axial translational movement without rotation to insert the male connector into the female connector.

BACKGROUND OF THE INVENTION

It is known, for example from patent WO2010/011883, to use a locking part formed as a transversely movable slider, this locking part being formed with a plate arranged transversely to the axis, provided with an axial opening through which the male connector passes, and a part forming a pushbutton such that manual pressure can unlock the connection. The transverse plate and the pushbutton are formed as a single L-shaped part. In addition, under the pushbutton is provided a flexible tab integral with the same part, which returns the slider toward a position that is off-center relative to the axis, this position forming the locking position where the male connector is retained in the female connector.

Given the fact that the pushbutton and the flexible tab extend from the plane of the plate, from the same side, towards the rear of the female connector, this arrangement has the following disadvantage: the force exerted by the flexible return tab has a resultant which is offset relative to the midplane of the locking plate, which tends to create a torque that jams the plate in the housing containing it, which can lead to incorrect return of the locking plate to the locked position.

Similarly, the force exerted by a user on the pushbutton is offset from the plane of the locking plate, which can lead to problems with unlocking.

There is therefore a need to provide an improvement that at least partially overcomes the aforementioned disadvantage of the known prior art.

SUMMARY OF THE INVENTION

Below is a description of the invention as characterized in the claims.

According to a first aspect, the invention relates to a female connector, for fluid connection, adapted for receiving a male connector having a retaining external annular rim, the female connector comprising a body with a bore of axis X, and a housing forming a slide (for example a slot) extending generally within a transverse plane YZ perpendicular to the axis, the housing comprising two parallel lateral grooves and the housing being open at least at one of its ends in the direction Z of the slide, forming a mouth of the housing, the female connector comprising a locking slider distinct from the body, adapted to be inserted into the housing and movable between a first position referred to as the locking position and a second position referred to as the unlocking position, the locking slider comprising a locking plate with a central opening through which the male connector can pass, and an actuation pushbutton formed integrally with the plate, configured to be pushed toward the axis in order to unlock the connection, with a retaining portion that is part of the locking plate and opposite the actuation pushbutton, which in the first position is adapted to abut against the retaining external annular rim to prevent removal of the male connector, the locking slider comprising at least one flexible tab integrally formed with the slider, the flexible tab returning the slider toward the first position and being able to flex to allow the plate to move toward the second position, characterized in that the flexible tab presses on each side of the mouth of the housing in the axial direction X, such that the return force is balanced along X and does not create torque that could jam the locking plate. The resultant of the return forces substantially coincides with the midplane of the locking plate, whereby one can ensure that the slider slides properly toward the locking position.

In one embodiment, the body has, in the area of the housing, a front ring and a back ring which surround the housing, the mouth being interposed between a front edge of the front ring and a back edge of the back ring, the flexible tab pressing on both the front edge and the back edge; such that the annular natural shape of the body of the female connector is used as bearing surfaces for the free end of the flexible tabs.

In one embodiment, the slider comprises two flexible tabs arranged symmetrically with respect to the XZ plane, so that each of the flexible tabs produces a return force which is advantageously balanced symmetrically with respect to the XZ plane; further redundancy is thus created, and in case of breakage or damage of one of the tabs, the other continues to provide a return force towards the locking position.

In one embodiment, each of the flexible tabs has a curvature oriented away from the pushbutton, so that the spring effect provided by such a shape can be properly harnessed; in addition, each of the flexible tabs preferably has a cross-section which decreases from its root to its free end. This represents an optimal shape for a cantilever tab.

In one embodiment, the flexible tabs are arranged under the actuation pushbutton, preferably interposed between the activation pushbutton and a top edge of the main opening; whereby natural protection is provided for the flexible tabs, preventing them from being damaged by contact with an external object. This also prevents them from catching on other elements or external objects during manipulation of the pipes and biopharmaceutical containers.

In one embodiment, the housing is open at both ends along Z and is symmetrical with respect to the XY plane; whereby the locking slider can be inserted from either side of the housing forming a slide.

In one embodiment, the retaining portion comprises a ramp to facilitate movement of the slider towards the axially centered position during insertion of the male connector.

This allows a low insertion force, with or without a chamfer at the front end of the male connector.

In one embodiment, the housing is asymmetrical with respect to the YZ plane so that the slider can only be inserted in the direction where the ramp is open towards the front in the direction of the male connector. This prevents assembling the slider backwards in the slot.

Preferably, a pin projecting in the axial direction is provided in the lower portion of the slider, designed to cooperate with at least one notch formed in the front wall of the housing forming the slide.

In one embodiment, the locking plate comprises projections for retaining the slider in the housing along the direction Z of the slide; once the slider is installed in the housing, these projections prevent its upward extraction: it can only be pushed downward by means of the activation pushbutton.

In one embodiment, the flexible tab has a width along X that is 2 to 3 times the width of the slot along X, and the activation pushbutton has a width along X that is 2 to 5 times the width of the slot along X. This allows optimizing the force produced by the return tabs toward the locking position, according to the selected width of the flexible tabs. As for the width of the activation pushbutton, the unlocking ergonomics are optimized by the width chosen.

In one embodiment, the pushbutton is curved with a radius of curvature close to that of the body of the female connector, and the pushbutton comprises lateral portions closer to the mouth along Z which form an abutment to stop the downward movement of the slider; this forms an activation pushbutton that is not very large radially, and a stop is provided in a very simple manner.

In one embodiment, the slider has a double symmetry, with respect to planes XZ and YZ; if the shape of the ramp portions of the male connector allows, a slide can be provided that can be inserted into the housing in either of the two possible directions (front/back), without no need for foolproofing.

In one embodiment, the body of the female connector is made of a first biocompatible plastic material and the locking slider is made of a second plastic material, such that the respective materials of the female connector and the locking slider can be optimized; in particular, a second plastic material can be chosen having a mechanical performance that optimizes the compromise between rigidity and elasticity for the flexible tabs. In addition, the respective optimization of the two materials allows manufacturing these components at particularly advantageous costs.

According to a second aspect, the invention relates to a locking slider of molded plastic, suitable for use as a locking element in a female connector as described above, the locking slider comprising a locking plate with a central opening through which the male connector can pass, and an actuation pushbutton integrally formed with the plate, configured to be pushed toward the axis to unlock the connection, the locking slider comprising at least one flexible tab integrally formed with the slider, the flexible tab returning the slider toward the first position referred to as the locking position, and able to flex to allow the plate to move toward the second position referred to as the unlocking position, the flexible tab being adapted to press on each side of the mouth of the housing.

BRIEF DESCRIPTION OF THE DRAWINGS

The figures of the drawings are now briefly described.

FIG. 3 is a perspective view of the locking slider.

FIG. 4 is perspective view of a cross-section of the connection device.

FIG. 5 shows a cross-section of the connection device.

FIG. 6 shows a top view of the female connector without the locking slider.

DETAILED DESCRIPTION OF EMBODIMENTS

Figure 1:
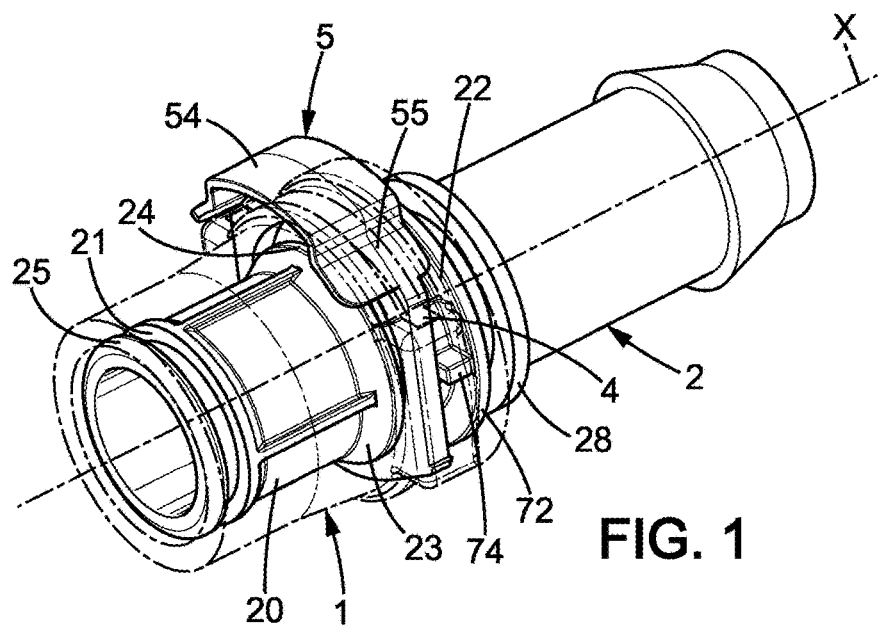
FIG. 1 is a perspective view of the connection device of the invention.

Below is a detailed description of several embodiments of the invention with examples and with reference to the drawings.

In the example shown, a female connector 1 is to be connected to a male connector 2 by a coupling movement during which the male connector is inserted into the female connector along an axial direction X.

For each of these connectors, in the present document the term "front" refers to the part closest to the complementary opposing connector, and the term "back" refers to the part farthest from the opposing connector.

The female connector 1 comprises in its rear portion a tubular end piece 17 intended for receiving a flexible tube (not shown), and in its front portion an interface for coupling with the male connector 2; said coupling interface will be described below.

Similarly, the male connector 2 comprises in its rear portion a tubular end piece 27 intended for receiving a flexible tube, and in its front portion an interface for coupling with the female connector, which will be discussed further below.

It should be noted here that the female connector and/or the male connector could have, in their rear portions, instead of an end piece for receiving a tube as shown, a flange for connecting to a container such as a flexible or rigid bag or a filter, for example.

Each of the tubular end pieces 17,27 is rotationally symmetrical about axis X, and they each comprise one or more catches 19,29 to retain the flexible tube, and a stop flange 18,28 which the flexible tube can abut against when inserted onto the end piece. As is known per se, a clamping collar may be added around the flexible tube and the end piece.

The male connector 2 comprises an axial passage 26 that is rotationally symmetrical about the axis, which allows passage of the fluid being conveyed through the fluidic coupling.

Starting from its front end portion, the male connector first comprises an entry chamfer 25, then an annular groove 21 for receiving a conventional O-ring 9, then a first intermediate portion 20, then a tapered portion 23 which flares outwardly and towards the back of the male connector.

Still in the rearward direction of the connector, the tapered portion 23 is extended by an annular rim 24 which forms a shoulder intended to bear against a complementary surface and to prevent removal of the male connector as will be seen further below.

Behind the removal-preventing annular rim 24, the male connector comprises a second intermediate portion 22 with a ring 72 having four small reinforcements 74, said ring with reinforcements serving as gripping means for pushing the male connector towards the female connector and also serving as an axial stop for the insertion movement.

Behind the ring 72, there is the flange 28 and the tubular end piece 27 already described.

The female connector 1 comprises an axial passage 15 that is rotationally symmetrical about the axis, allowing passage of the fluid conveyed through the fluidic connection.

Starting from its back end portion, the female connector 1 comprises the tubular end piece 17 already described, then a main body 10 for receiving the front portion of the male connector, with a bore of a slightly larger diameter than the outer diameter of the front portion of the male connector 2, to permit insertion of the front portion of the male connector and to be able to exert radial pressure on the O-ring 9 to ensure the sealing function.

Facing the tapered portion 23, the body 10 has an inner dimension that increases until it reaches a housing for the locking slider 5 which will be discussed further below.

A housing is provided in the front portion of the female connector, forming a slide 4 extending in a transverse plane YZ perpendicular to the axis X. In the current case, the housing forming a slide is presented as a transverse slot. In addition, in the example illustrated, this slot is open at both sides in the transverse direction Z which allows insertion of a locking element which will be discussed further below.

In the example shown, the housing comprises a first groove 41 and second groove 42 which face each other and are arranged symmetrically with respect to the XZ plane.

Finally, the body 10 of the female connector comprises a front ring 11 which forms the front end and against which the ring 72 of the male connector will abut at the end of the insertion movement. A back ring 12 extends from the other side of the slot and faces the front ring.

It should be noted here that it is not strictly necessary for the slot forming the slide 4 to be open at both sides. In an alternative (not shown), one side may be at least partially closed which would form a bottom for the housing forming the slide 4, while the opposite side would constitute the mouth 40 through which the locking slider 5 is inserted.

The locking slider 5 already mentioned is intended to be inserted into said housing (forming the slide 4) of the body of the female connector. The locking slider 5 is formed as a molded plastic part comprising a locking plate 50, arranged transversely to axis X, with a central opening 58 through which the male connector 2 can pass.

In addition, the locking slider 5 comprises an actuation pushbutton 54 integrally formed with the plate, configured to be pushed toward the axis to unlock the connection, by recentering the axial opening 58.

In addition, the locking slider 5 comprises two flexible tabs 53 formed integrally with the slider, the flexible tabs returning the slider toward the first position, referred to as the locking position, with the opening 58 being offset with respect to X (FIGS. 4 and 5), the annular rim 24 being retained by the retaining portion 51. The two flexible tabs 53 are adapted to flex to allow the locking plate 50 to move to the second position, referred to as the unlocking position, which corresponds to recentering the opening 58 and a relative movement of the annular rim 24 with respect to the retaining portion 51.

Advantageously, the two flexible tabs 53 are arranged symmetrically with respect to the XZ plane. In addition, the flexible tabs are arranged under the actuation pushbutton 54. Preferably, they are interposed between the activation pushbutton 54 and a top edge 58a of the main opening 58. In addition, one will note that each of the flexible tabs 53 has a curvature oriented away from the pushbutton, in other words curving downwards. In addition, each of the flexible tabs 53 preferably has a cross-section which decreases from its root 53a to its free end 53b.

Advantageously, each of the flexible tabs 53 presses on each side of the mouth 40 of the housing in the axial direction X.

It should be noted here that instead of having two flexible tabs, it is also possible to have only one flexible tab 53 pressing on the body of the female connector on each side of the mouth, with the same advantages.

Figure 2:
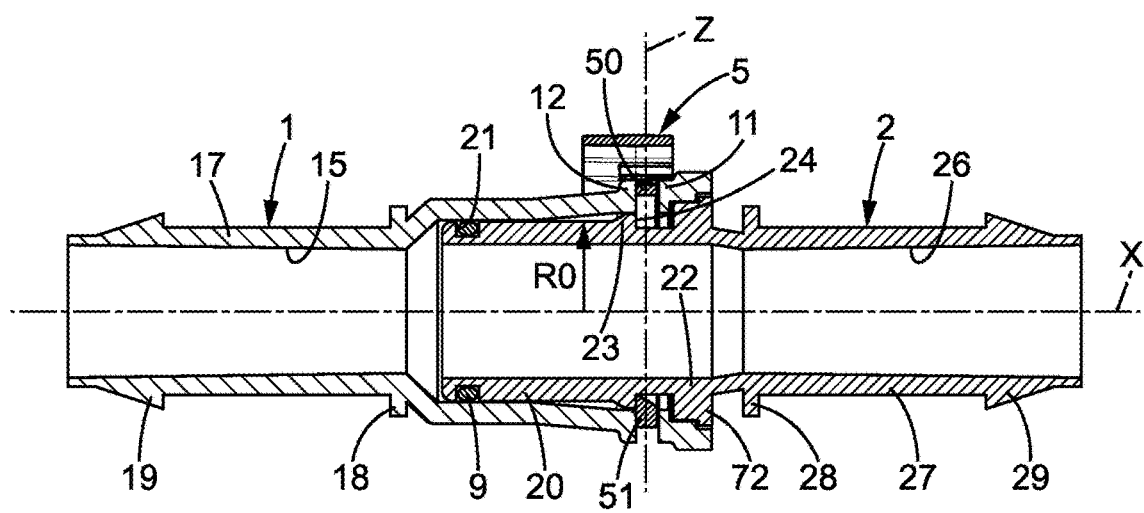
FIG. 2 is an axial sectional view of the connection device of FIG. 1, in the coupled position, along section line II-II shown in FIG. 5.
Figure 8A:
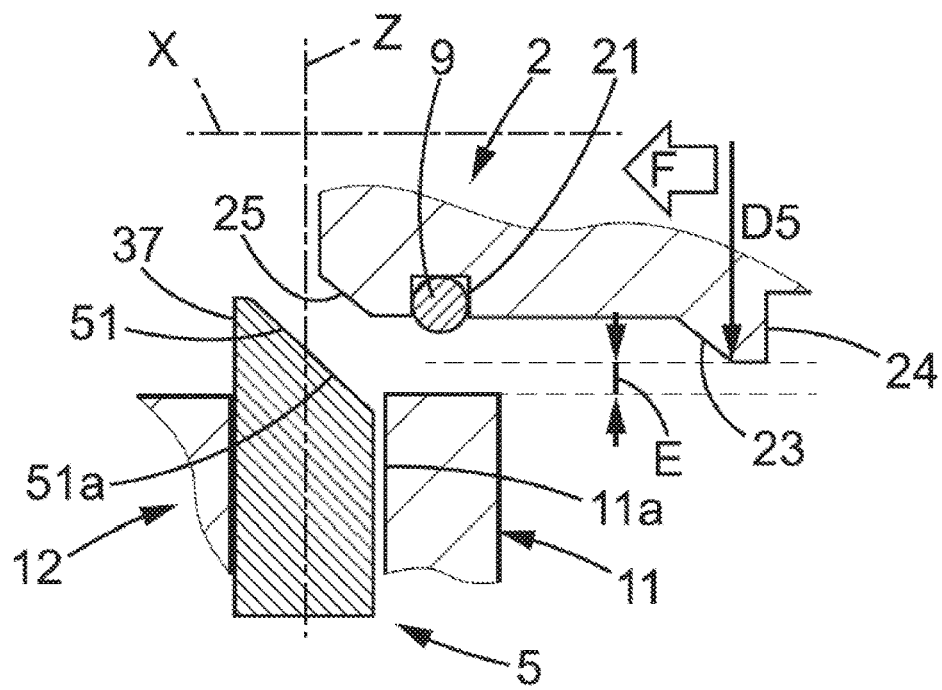
FIGS. 8A and 8B represent two variant profiles of the front portion of the male connector with a locking slider that is respectively symmetrical and asymmetrical with respect to the YZ plane.

The diameter D3 of the axial opening 58 of the locking plate 50 is greater than the diameter D5 of the male connector at the periphery of the annular rim 24 (FIG. 8A). However, the axial opening 58 may be off-center, in the current case offset upwards, which provides a locking configuration of the connection (FIG. 2), the first position.

Prior to insertion of the male connector, the locking slider 5 can be maintained in a standby position within the housing by various means. In the illustrated example, the locking slider is held in the housing by two projections 52, arranged substantially at the lower ends (opposite the position of the pushbutton) of the side walls 57 of the locking plate. The two projections 52, which could also be called hooks, catches, or claws, extend outward generally in the Y direction. Facing recesses 43 are provided at the lower end of the grooves 41, 42 of the housing, these recesses, in particular those denoted 43, being intended to receive the projections 52 of the slider when said slider reaches the position where the axial opening 58 is substantially centered on axis X.

The flexibility of the slider 5 and of the projections 52 allows, prior to coupling the male connector within the female connector, inserting the locking slider along the Z direction from the upper mouth 40 of the housing.

Once the slider is installed in the housing, these projections 52 prevent its upward removal: it can only be pushed downward by means of the activation pushbutton 54.

Advantageously, the lower retaining portion 51 comprises a ramp 51a, in other words a bevel, intended to facilitate the insertion movement of the male connector which must move the slider downward until the retaining annular rim 24 has passed beyond the retaining portion 51, which then causes the slider to rise due to the return forces of the flexible tabs 53.

The female connector 1 and the male connector 2 can be obtained by molding a first plastic material, in particular plastic materials biocompatible with biopharmaceutical substances, for example polypropylene, polyethylene, polycarbonate, polysulfone, polyvinylidene chloride, polyethylenimine. Preferably, polyethylene or polypropylene is chosen.

The locking slider 5 may be also created of the same material, for example polybutylene terephthalate, polypropylene, polyethylene, polycarbonate, polyoxymethylene; alternatively, and advantageously in some cases, the slider may be made of a second plastic material that is different from that of the connectors, typically polybutylene terephthalate or polycarbonate, with mechanical and elastic properties more targeted for optimizing the flexible tabs, as the locking slider is never in contact with the substances conveyed in the pipe to be connected. For the flexible tabs, one can optimize the compromise between stiffness and elasticity of the second material. One can also take into account the changing properties of the material due to natural aging or caused by light or other radiation, or other physico-chemical exposure.

Figure 7:
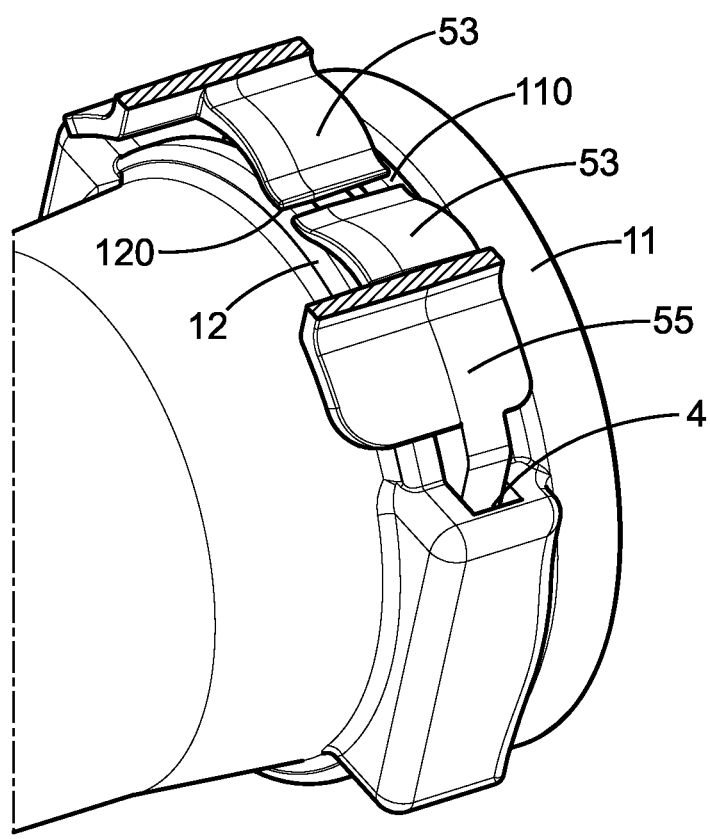
FIG. 7 shows a partial perspective view illustrating the flexible tabs and their bearing areas.

As illustrated in FIG. 7, the body 10 has a front ring 11 and a back ring 12 in the housing area, already mentioned, which surround the housing. The mouth 40 is interposed between a front edge 110 of the front ring 11 and a back edge 120 of the back ring 12; the flexible tab 53 presses on both the front edge 110 and back edge 120.

We also note that the pushbutton 54 is curved with a radius of curvature R1 close to that of the radius of curvature R0 of the body of the female connector. The pushbutton 54 comprises side portions 55 closer to the mouth along Z which form a stop for the downward movement of the slider 5, to prevent the upper edge 58a from interfering with the withdrawal of the male connector when the pushbutton is pressed in all the way.

As illustrated in FIG. 8A, to facilitate deflection of the slider at the time of insertion, for example in the case where the entry ramps (formed by the entry chamfer 25 and the tapered portion 23) are quite steep, the beveled face 51a on the front face of the retaining portion 51 allows reducing the insertion forces F and facilitates the descent of the locking slider. However, on the opposite side of the slider cross-section (back face 37), a straight profile is maintained so that the outer rim 24 of the male connector lies flat against the back face 37 of the slider. Thus, pulling on the male end piece after coupling will not lower the slider, as the forces are transmitted by the interface between the annular rim 24 and the back face 37 of the slider, then by the other face of the slider which lies against the face 11a of the front ring 11.

One will notice some clearance E between the front portion of the male connector and the inner diameter of the front ring 11, which ensures that the male connector including the shoulder 24 can pass beyond the front ring 11 of the slot. Of course, as already mentioned, clearance must also be provided between the axial opening 58 and the outside diameter D5 of the front portion of the male connector.

Figure 8B:
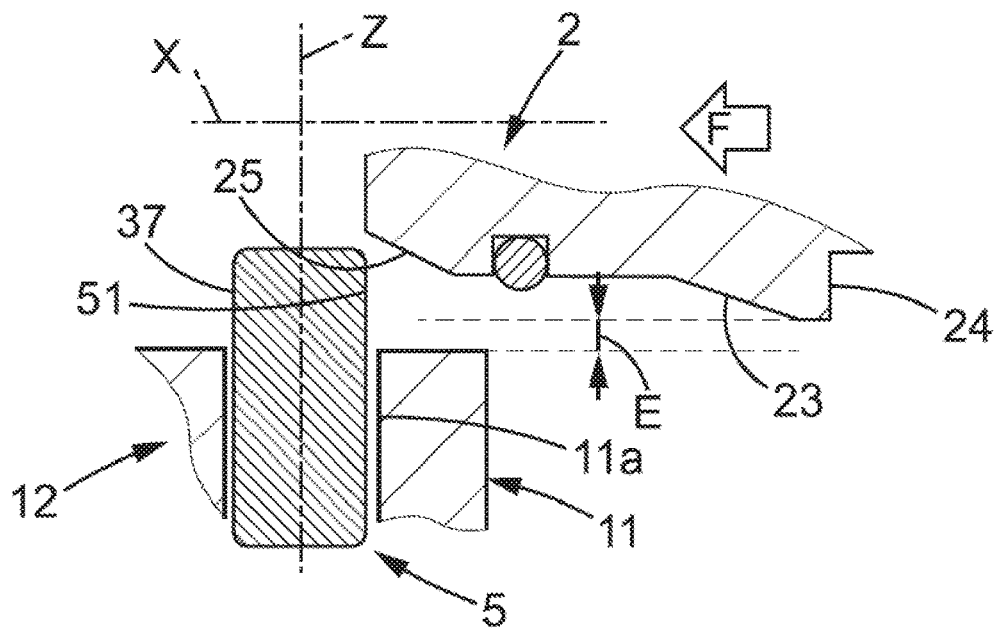

As illustrated in FIG. 8B, in the case where the front portion of the male connector has entry ramps of low slope, one can use a retaining portion 51 that has a symmetrical profile in the YZ plane. In this case, the slider can be formed with a double symmetry, namely a symmetry in the XZ and YZ planes. In this case, there is no risk of error when assembling the slider within the housing forming the slide 4.

Figure 9A:
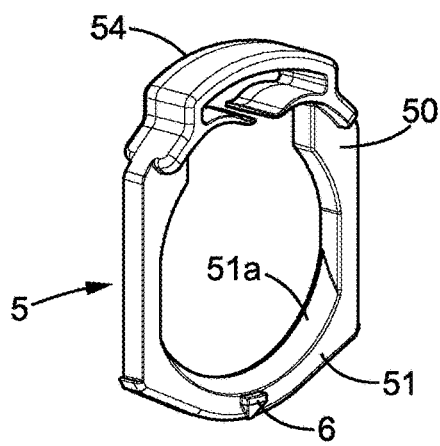
FIGS. 9A, 9B, and 9C illustrate another variant with position foolproofing affecting the locking slider and the housing in the female connector.
Figure 9B:
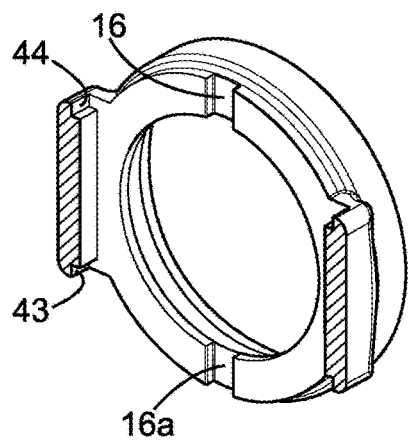
Figure 9C:
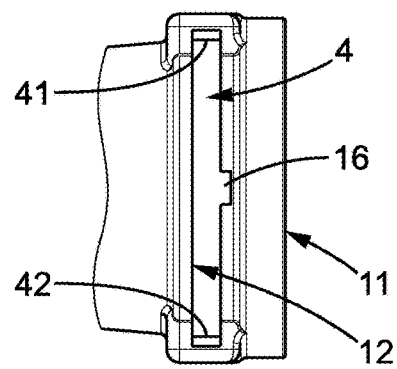
Figure 10:
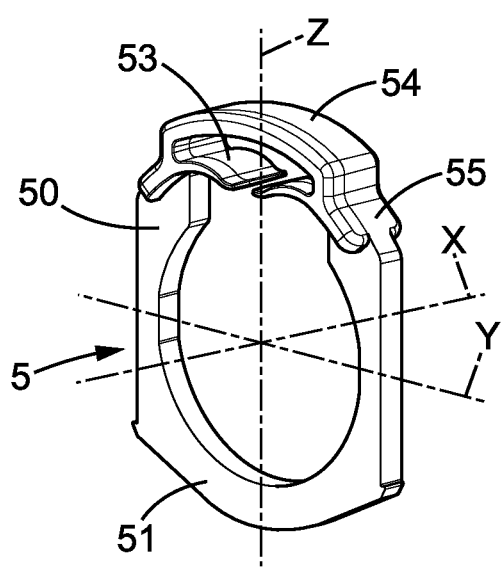
FIG. 10 shows a perspective view of a symmetrical variant of the slider.

In an optional feature illustrated in FIGS. 9A, 9B, 9C, one can provide a foolproofing function to ensure the proper orientations when assembling the slider inside the housing forming the slide 4. In particular, when using a slider retaining portion having an asymmetrical cross-section (ramp 51a), one must ensure that the beveled portion is placed on the insertion side of the male connector.

For this purpose, a pin 6 is arranged in the central area of the retaining portion and extends in the direction of axis X. Two notches 16,16a shaped so as to be complementary to said pin 6 (or even larger) are formed in the midplane XZ of the slot, one at the top and one at the bottom. The locking slider thus cannot be inserted in reverse with the beveled portion pointed toward the wrong side, because the pin will abut against the back ring 12 where there is no notch.

Note that in the example illustrated, the male connector can rotate within the female connector around X; there is no specific orientation for inserting the male connector into the female connector.

However, it is not excluded to provide an anti-rotation device which may, for example, be arranged between the small reinforcements of the ring 72 of the male connector and the front ring 11 of the female connector.

The invention claimed is:

1. A female connector, for fluid connection, adapted for receiving a male connector having a retaining external annular rim, the female connector comprising:

a body provided with a bore of longitudinal axis X that defines an axial direction, the body being provided with a housing, the housing including a slide formed as a slot, the slide extending generally within a transverse plane YZ perpendicular to the longitudinal axis X so as to define a sliding direction along an axis Z, the housing comprising two parallel lateral grooves and the housing being open at least at one of its ends in the sliding direction, forming a mouth of the housing; and a locking slider, distinct from the body, adapted to be inserted into the housing and movable between a first position referred to as the locking position and a second position referred to as the unlocking position, the locking slider being inserted into the housing through the mouth, wherein the locking slider comprises a locking plate with a central opening through which the male connector can pass, and an actuation pushbutton formed integrally with the locking plate, configured to be pushed parallel to the two parallel lateral grooves and perpendicular to the axial direction, toward a position closer to the longitudinal axis X, in order to unlock the connection, wherein the locking plate is provided with a retaining portion opposite the actuation pushbutton, which in the first position is adapted to abut against the retaining external annular rim to prevent removal of the male connector, wherein the mouth of the housing extends between two opposite sides spaced apart along the axial direction, the two opposite sides being included in the body and extending each transversally relative to the longitudinal axis X, the two opposite sides being each intersected by the XZ plane, wherein the locking slider comprises at least one flexible tab integrally formed with the locking plate, the at least one flexible tab returning the locking slider toward the first position and being able to flex to allow the locking plate to move toward the second position, and wherein the at least one flexible tab presses on each of the two opposite sides of the mouth of the housing while entirely extending outside the housing, so as to exert a pressure parallel to the axis Z on the body on the two opposite sides that are spaced in the axial direction of the longitudinal axis X, such that the return force is balanced along the longitudinal axis X and does not create torque that could jam the locking plate.

2. The female connector according to claim 1, wherein the body has, in the area of the housing, a front ring and a back ring which surround the housing, the mouth being interposed between a front edge of the front ring and a back edge of the back ring, the at least one flexible tab (53) pressing on both the front edge and the back edge.

3. The female connector according to claim 1, wherein the locking slider comprises two flexible tabs arranged symmetrically with respect to the XZ plane.

4. The female connector according to claim 1, wherein the two flexible tabs are arranged under the actuation pushbutton and are interposed between the actuation pushbutton and a top edge of the central opening, the locking slider being a one-piece locking slider.

5. The female connector according to claim 1, wherein the housing is asymmetrical with respect to the YZ plane so that the locking slider can only be inserted in the direction where a ramp is open towards the front in the direction of the male connector.

6. The female connector according to claim 5, wherein a pin projecting in the axial direction defined by the longitudinal axis X is provided in a lower portion of the locking slider, the pin being configured to engage with at least one notch arranged in the front wall of the housing.

7. The female connector according to claim 1, wherein the locking plate comprises projections for retaining the locking slider in the housing along the direction Z of the slide.

8. The female connector according to claim 1, wherein the at least one flexible tab has a width along the longitudinal axis X that is 2 to 3 times the width of the slot along the longitudinal axis X, and the actuation pushbutton has a width along the longitudinal axis X that is 2 to 5 times the width of the slot along the longitudinal axis X.

9. The female connector according to claim 1, wherein the actuation pushbutton is curved with a radius of curvature close to that of the body of the female connector, and the actuation pushbutton comprises end portions closer to the mouth which form an abutment to stop the downward movement of the locking slider.

10. The female connector according to claim 1, wherein the locking slider has a double symmetry, with regard to the planes XZ and YZ.

11. The female connector according to claim 1, wherein the body of the female connector is made of a first biocompatible plastic material and the locking slider is made of a second plastic material.

12. A female connector, for fluid connection, adapted for receiving a male connector having a retaining external annular rim, the female connector comprising:
a body provided with a bore of longitudinal axis X that defines an axial direction, the body being provided with a housing, the housing including a slide that extends generally within a transverse plane YZ perpendicular to the longitudinal axis X so as to define a sliding direction along an axis Z, the housing being open at least at one of its ends in the sliding direction, forming a mouth of the housing; and
a locking slider distinct from the body, adapted to be inserted into the housing and movable between a locking position and an unlocking position, the locking slider being inserted into the housing through the mouth and being engaged with the retaining external annular rim in the locking position to prevent removal of the male connector,
wherein the locking slider comprises a locking plate having a central opening through which the male connector can pass, and an actuation pushbutton formed integrally with the locking plate, configured to be pushed parallel to the sliding direction toward the longitudinal axis in order to unlock the connection,
wherein the mouth of the housing extends between two opposite sides spaced apart along the axial direction, the two opposite sides being included in the body and extending each transversally relative to the longitudinal axis X, the two opposite sides being each intersected by the XZ plane,
wherein the locking slider comprises at least one flexible tab integrally formed with the locking plate, the at least one flexible tab returning the locking slider toward the locking position and being able to flex to allow the locking plate to move toward the unlocking position, and
wherein the at least one flexible tab presses on each of the two opposite sides of the mouth of the housing while entirely extending outside the housing, so as to radially press on the body on the two opposite sides that are spaced in the axial direction of the longitudinal axis X, such that the return force is balanced along the longitudinal axis X.

13. The female connector according to claim 12,
wherein two flexible tabs form the at least one flexible tab of the locking slider, each of the two flexible tabs extending from a root to a free end, and
wherein the two flexible tabs are arranged symmetrically with respect to the XZ plane, each of two flexible tabs having its root distal from the XZ plane and its free end proximal to the XZ plane.

14. The female connector according to claim 13, wherein each of the two flexible tabs has a cross-section that decreases from its root to its free end.

* * * * *